(No Model.) 2 Sheets—Sheet 1.
A. M. BERNARD & D. C. KNIGHT.
COMBINATION CULTIVATOR.
No. 577,224. Patented Feb. 16, 1897.
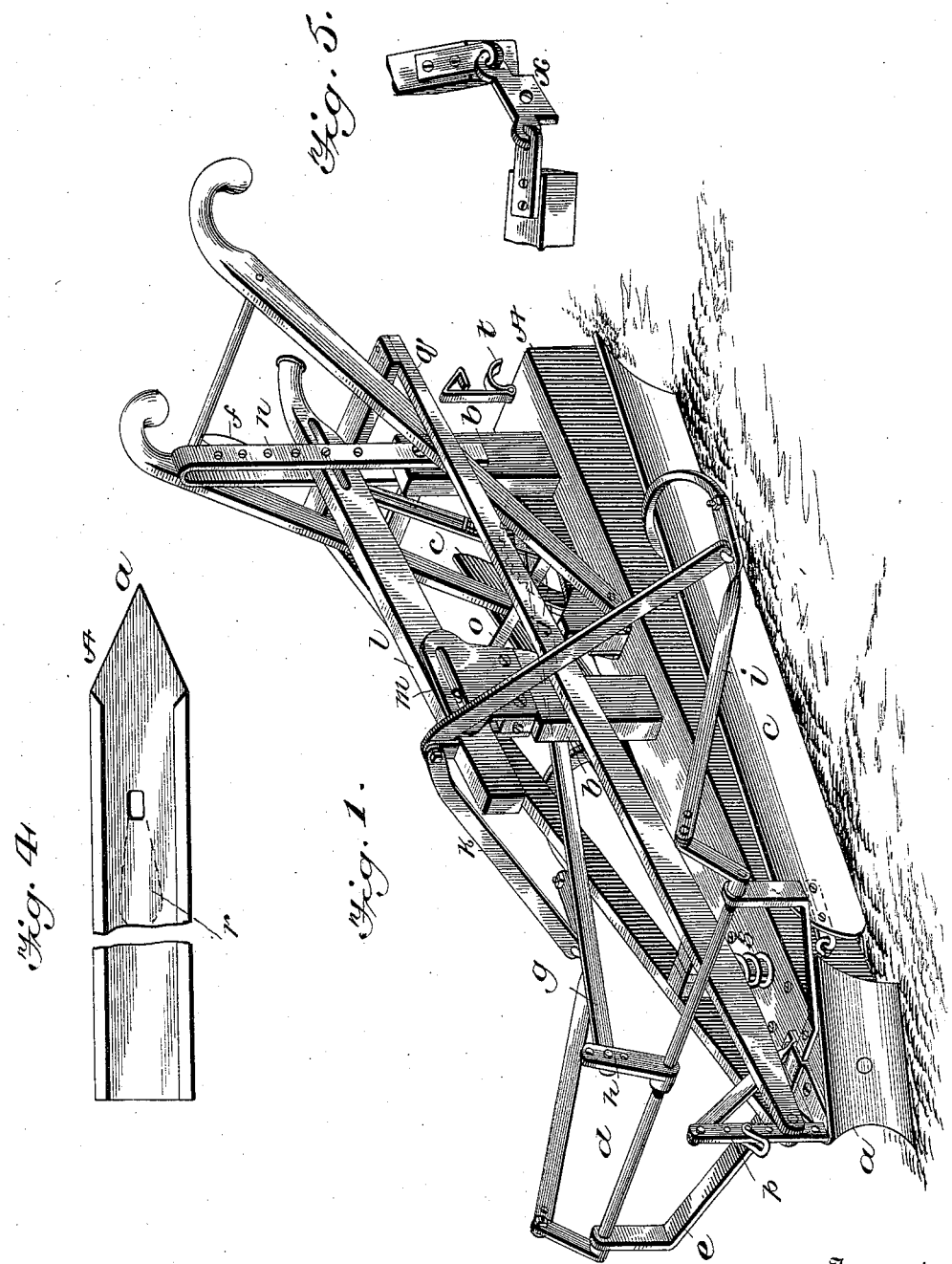

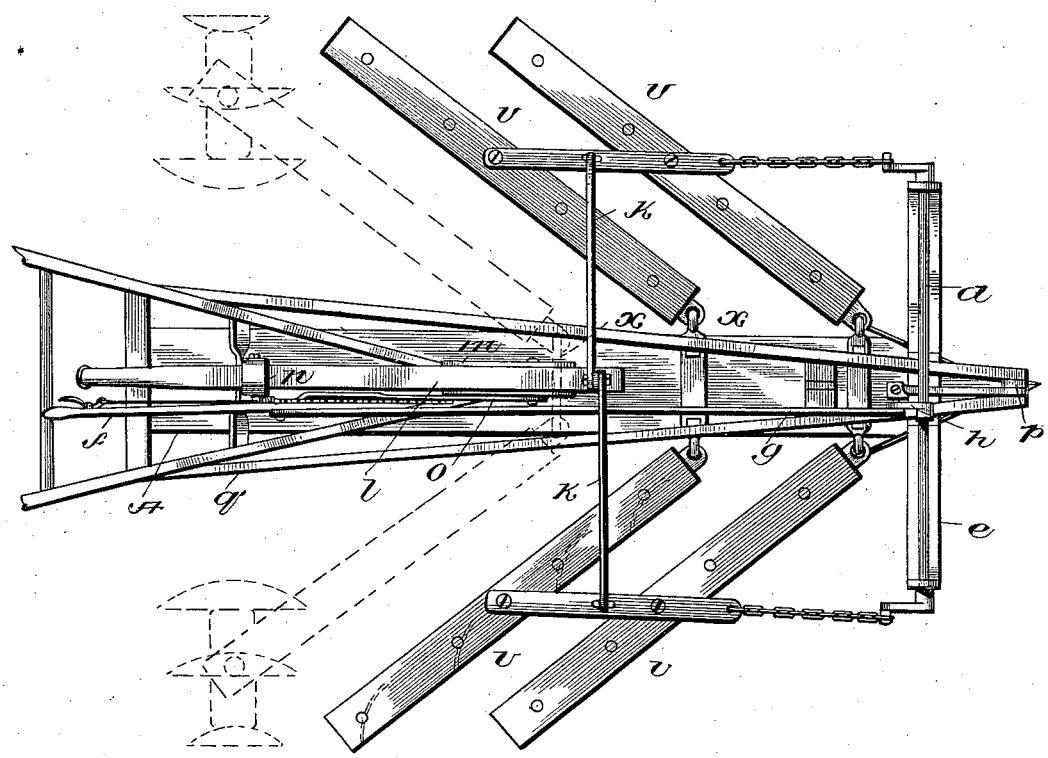
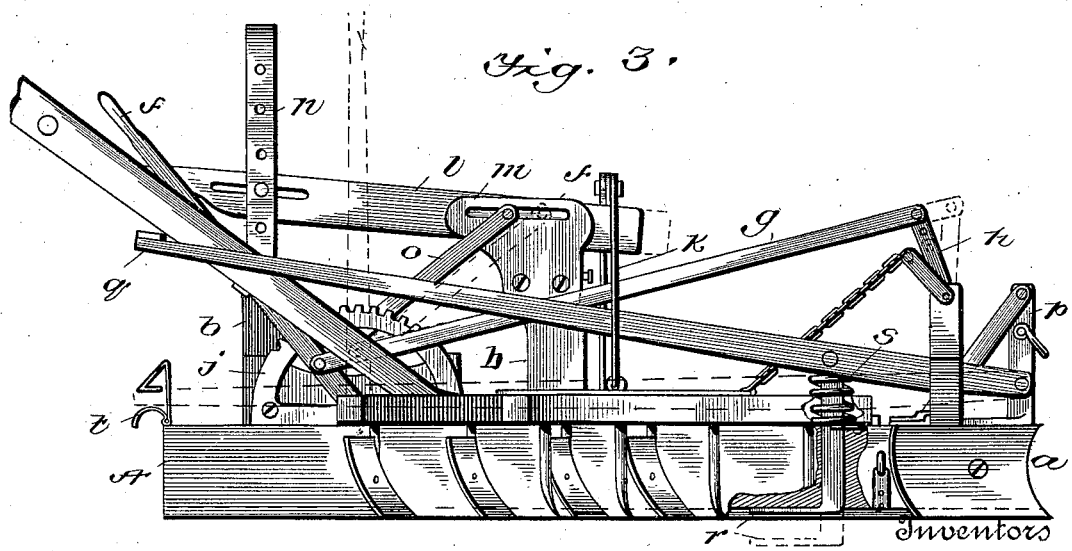

UNITED STATES PATENT OFFICE.

ARTHUR M. BERNARD AND DAVID C. KNIGHT, OF NEW IBERIA, LOUISIANA.

COMBINATION-CULTIVATOR.

SPECIFICATION forming part of Letters Patent No. 577,224, dated February 16, 1897.

Application filed July 25, 1896. Serial No. 600,568. (No model.)

*To all whom it may concern:*

Be it known that we, ARTHUR M. BERNARD and DAVID C. KNIGHT, citizens of the United States, residing at New Iberia, parish of Iberia, State of Louisiana, have invented a Combination-Cultivator, to be used in cultivating any kind of plant that is sown in drills or rows of from four (4) feet to seven (7) feet in width, of which the following is a specification.

Our combination-cultivator is intended to do away with the use of the plow in cultivating all kinds of plants that are sown in drills or rows after the bed is once thrown to the plant, thereby reducing the cost of cultivating.

The combination-cultivator consists of, first, a slide or runner, which may be of solid wood or iron boxing, which is intended to run between two rows or drills of plants. Upon this slide we place wings having harrow-teeth reaching out and up to the plant to be cultivated. Upon this slide we also place wings with shovels attached also reaching out and up to the plant on each side of the cultivator. Wings with disks are also attached to the runner on each side of slide reaching out and up to the plant. Also moldboards are attached to each side of slide reaching out and up to the plant. With either of these attachments adjusted to the slide or runner it is then drawn down the middle between two rows by one or more animals, as the nature of the case demands, and wings or moldboards having been adjusted to suit the width and height of rows the earth is either stirred up and pulverized with shovels or harrow-teeth or thrown to the plant with disks or drawn gently to the plant with moldboards. As the machine is drawn down the middle between two rows it works one side of two rows, thereby working one entire row with each trip of the machine. The operator has full control of the machine from the fact that it can be adjusted to the different widths and heights of rows.

Figure 1 is a perspective view of our cultivator when used with the moldboards. Fig. 2 is a plan view of the same when used with the harrow and cultivator teeth, the disk-wings being shown in dotted lines. Fig. 3 is a side view of the same. Fig. 4 is a bottom plan view of a portion of the slide or runner which forms a base for the attachment of the various parts, the foot for throwing the point out of the ground being shown in dotted lines. Fig. 5 is a perspective view of the connecting-clevis for the disk-wings.

Like letters indicate like parts in the several views.

A is the slide or runner, having a groove in its lower face, as shown in Fig. 4, and a point $a$. Rising from the runner are two standards $b$. Moldboards $c$ are connected at their front ends by links to the point and are moved outward and upward at their rear ends by means of a rock-shaft $d$, journaled in supports $e$, secured to the runner and actuated by a lever $f$, connected thereto by a bar $g$. Said bar $g$ is attached to an adjusting-standard $h$, secured centrally to the rock-shaft. At the outer end of the rock-shaft cranks are provided, which are connected to bars $i$, bolted to the moldboards. A rack $j$, Fig. 3, rises from the runner to hold the lever $f$ in adjusted position. Connected to the bars $i$ are two rods $k$, pivoted at their upper ends upon a lever $l$, fulcrumed in a slotted plate $m$, secured to the front standard $b$ and held in adjusted position by a pin passing through a rack $n$ and through a slot in the lever. By operating this lever the moldboards or the other attachments are raised and brought inward toward the runner. A rod $o$ is connected at its lower end to the lever $f$ and at its upper end to the lever $l$ by a pin passing through the slotted plate $m$. Pivoted to the clevis $p$ is a foot-lever $q$, fulcrumed upon a presser-foot $r$, having a shank passing through the runner, said shank being encircled by a spring $s$, Fig. 3, which serves to hold the lever in its normal upper position. When depressed at its rear end by the foot of the operator, it may be held by a pivoted catch $t$, as shown in dotted lines in Fig. 3. This lever serves to hold the presser-foot $r$ down and throws the point $a$ of the implement out of the ground.

The device as thus far described may be used for throwing fresh soil to the plants from between two rows.

When the character of the soil or the condition of the plants requires pulverized soil, the harrow or cultivator wings $v$, Figs. 2 and 3, are attached to the runner in place of the moldboards or in connection therewith. Harrow-disk wings $w$ may also be attached to the runner and serve to throw the finely-pulverized soil to the plants after it has been broken up by the harrow-teeth. The wings are connected at their front ends by clevises $x$, which are to be bolted to the runner. Ordinary handles are attached to the runner for guiding the implement.

In passing between the rows of plants the levers are operated to throw the wings inward or outward to the required distance to properly cultivate the plants.

Our implement is very effective in the cultivation of nearly all kinds of plants, is readily convertible for the various operations required, and, considering the variety of work which it performs, is simple in construction and easy to control.

What we desire to secure by Letters Patent and claim is—

1. A cultivator comprising a runner or slide, grooved in its under face, having a point attached at its front end, moldboards pivoted at their front ends to the point, and connected at their rear ends by bars to a lever for adjusting them inward, outward and upward, and a presser-foot passing through the runner and connected to a lever for operating it, substantially as described.

2. A convertible implement for cultivating plants, consisting of a runner, having a groove in its under side, wings provided with moldboards, cultivator-teeth and harrows for detachable connection to the runner, a rock-shaft pivoted to supports on the runner, and connected to the wings, and levers for adjusting the wings, substantially as described.

3. A cultivator consisting of a runner having a grooved under face, a presser-foot passing through an aperture in the runner and having a spring surrounding its shank for keeping it normally in its upper position, a lever connected to the shank of the presser-foot above the spring for depressing the foot, and movable wings attached to the runner and adjustable by levers, substantially as described.

ARTHUR M. BERNARD.
DAVID C. KNIGHT.

Witnesses:
F. W. BAUMAN,
HECTOR REYNAUD.